April 21, 1959 P. M. CHRISTENSEN 2,883,586

CIRCUIT BREAKERS HAVING PLUG-IN TYPE TERMINALS

Filed May 8, 1953 4 Sheets-Sheet 1

INVENTOR.
PAUL M. CHRISTENSEN
BY Edwin Levisohn + Harry Cohen
ATTORNEYS

CIRCUIT BREAKERS HAVING PLUG-IN TYPE TERMINALS

Filed May 8, 1953

4 Sheets-Sheet 2

INVENTOR.
PAUL M. CHRISTENSEN
BY Edwin Levisohn & Harry Cohen
ATTORNEYS

April 21, 1959 P. M. CHRISTENSEN 2,883,586

CIRCUIT BREAKERS HAVING PLUG-IN TYPE TERMINALS

Filed May 8, 1953 4 Sheets-Sheet 3

INVENTOR.
PAUL M. CHRISTENSEN
BY Edwin Levisohn & Harry Cohen
ATTORNEYS

April 21, 1959

P. M. CHRISTENSEN 2,883,586

CIRCUIT BREAKERS HAVING PLUG-IN TYPE TERMINALS

Filed May 8, 1953

4 Sheets-Sheet 4

INVENTOR.
PAUL M. CHRISTENSEN
BY Edwin Levisohn + Harry Cohen
ATTORNEYS

United States Patent Office 2,883,586

Patented Apr. 21, 1959

2,883,586

CIRCUIT BREAKERS HAVING PLUG-IN TYPE TERMINALS

Paul M. Christensen, West Orange, N.J., assignor to Federal Electric Products Company, Newark, N.J., a corporation of Delaware Application May 8, 1953, Serial No. 353,843

22 Claims. (Cl. 317—119)

The present invention relates generally to circuit breakers and in particular to terminal elements of the readily-disconnectable type which both mechanically lock and electrically connect the circuit breakers to companion line terminals.

The primary object of the present invention is the provision of a terminal element of the described type which has provision within its width-wise dimension for the mounting thereof in a circuit breaker casing or housing.

Another object is the provision of a plug-in terminal formed by a strip of conducting material which is bent upon itself and provided with generally improved means for securing a conductor thereto.

Another object is the provision of a plural-stab terminal construction for use in circuit breakers of relatively higher current ratings.

A further object is the provision of a generally improved and simplified circuit breaker construction.

The above and other objects, features and advantages of the present invention will be more fully understood from the following description considered in connection with the accompanying illustrative drawings.

Figures 1, 2, 3, 4, 5:
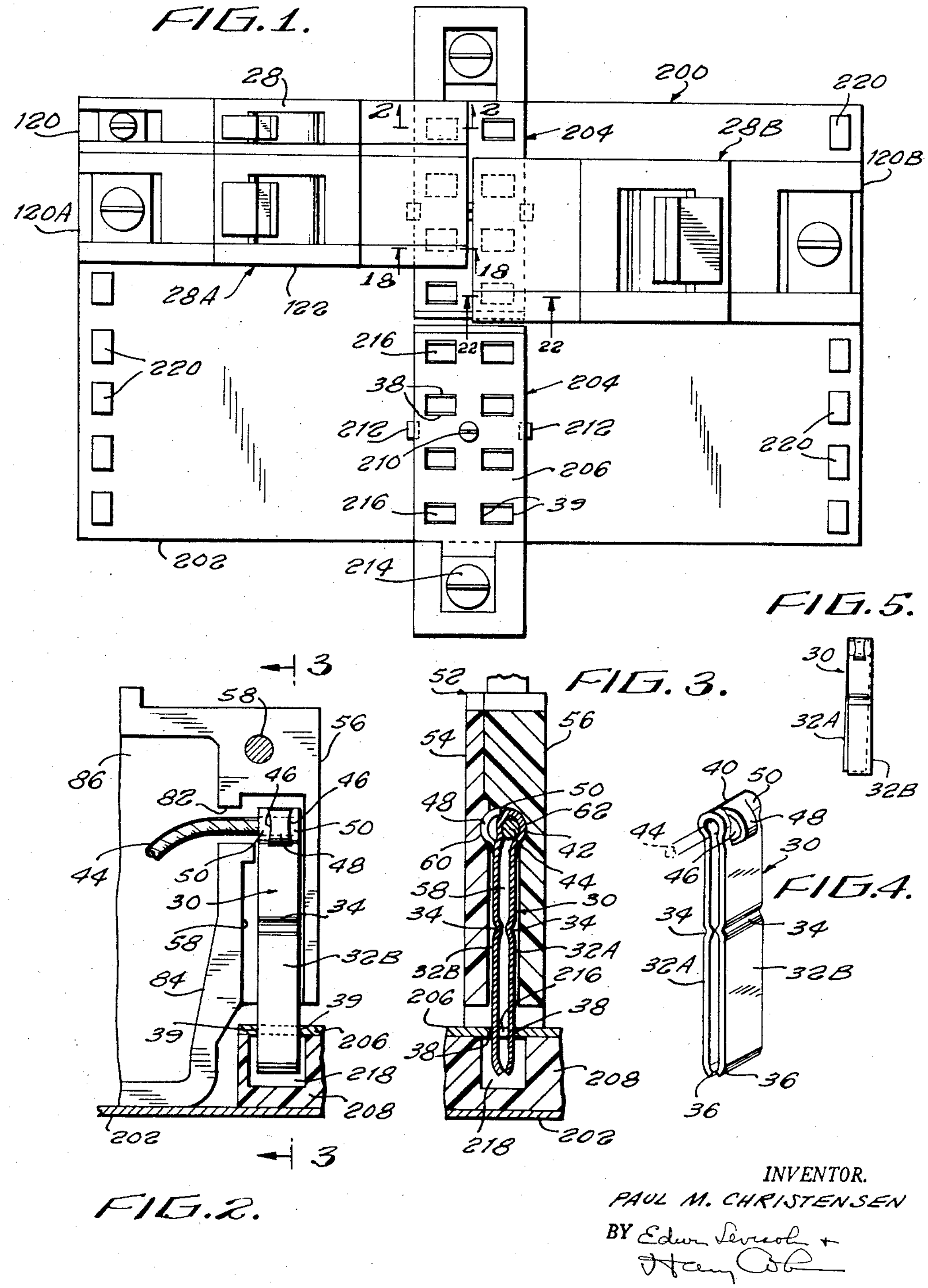
Fig. 1 is a plan view of a panelboard provided with a plurality of circuit breakers pursuant to the best mode now contemplated by me for carrying out the invention.
Fig. 2 is a fragmentary sectional view taken on the line 2—2 of Fig. 1.
Fig. 3 is a sectional view taken on the line 3—3 of Fig. 2.
Fig. 4 is a perspective view of the terminal illustrated in Figs. 2 and 3.
Fig. 5 is a view in elevation, on a reduced scale, of the terminal illustrated in Fig. 4.

Referring now to Figs. 1–5 of the drawings in detail, there is illustrated at 200 a circuit breaker panelboard of the general type illustrated and described in my Patent No. 2,599,695 dated June 10, 1952. Said panelboard comprises the mounting member or plate 202 which is provided, as here shown, with a pair of transversely disposed contact mounting units 204—204. Each of said units comprises a conducting bus bar 206 which is suitably secured to an insulated base member 208 as by the screw 210, the base member being suitably secured onto the mounting member 202 as by the struck-up portions 212 of the latter which engage in the insulated base 208. Each bus bar or contact strip 206 is provided with a terminal 214 for connection to a suitable power line and is also provided with the apertured contacts or terminal portions 216. As here shown, said contact portions 216 are in the form of rectangular cut-outs which extend in equally spaced relation longitudinally of the bus bar 206 and which are paired transversely of the bus bar for mounting circuit breakers 28, 28A and 28B in end-to-end relation transversely of the bus bar. The insulating block 208 is provided with a recessed portion 218 underlying each of the contact portions 216 of the bus bar 206. While two bus bars are illustrated as disposed in end to end relation in Fig. 1, it will be understood that in place thereof there may be only a single bus bar which extends completely across the mounting member 202. The mounting member 202 is preferably provided with suitable struck-up portions or holding elements 220 which are similar to those indicated at 42 in Fig. 2 of my prior patent, for engagement in complementary recesses in the circuit breaker casing, such as indicated at 96 in said prior patent, to retain the latter in position on the mounting member pan 202. In addition, the mounting pan may be provided, if desired, with mechanism for adjusting the latter in position in a suitable enclosure, as illustrated and described in said patent.

As illustrated and described in said patent, while the retaining elements provided on the pan mechanically retain the circuit breaker casing, at one end thereof, in position on the panelboard, the circuit breakers are provided at the other end thereof with readily detachable elements in the form of plug-in or stab terminals which releasably lock with the contact making portion of the bus bar to provide both a good electrical connection and a firm mechanical connection which aids in retaining the circuit breaker in position on the panelboard. Pursuant to the present invention, provision is made for a generally improved terminal of the quick disconnect type which releasably engages with the contact making portions 216 of the bus bar 206.

Referring now to Figs. 2–5 in detail, there is shown a plug-in terminal contact 30 of the prong or stab type.

Said contact is formed from a rectangular strip of conducting material which is bent upon itself to form the companion stab elements 32A and 32B. It will be understood that the material from which the stab 30 is fabricated is provided with a desired degree of natural or inherent resiliency so that the stab elements 32A—32B constitute spring fingers. In order to increase the spring action of the fingers, the latter are provided with the confronting struck-out portions 34—34 which constitute fulcrums, as hereinafter described in detail, to decrease the lever arm distance of said spring fingers. At their free ends, the fingers or stabs are bent inwardly to facilitate the insertion thereof into the slotted contact portions 216 and the latter are beveled at opposing sides thereof, as indicated at 38 to facilitate the entry of the stab contact 30 into the slotted contact 216. At the upper end 40 of the stab terminal 30, the finger 32A is rounded throughout the entire widthwise dimension thereof, as at 42 to provide a seat in which a flexible conductor 44 is mounted. In order to secure said connector 44 in position in the seat 42, the companion finger 32B is provided at the upper end thereof, with the spaced longitudinally extending slits 46—46 which define the central portion 48 and the outer portions 50—50. Said portions 50—50 are suitably forced toward the opposing rounded portion 42 of the finger 32A and against the conductor to clamp the conductor in position at the upper end of the contact to provide for a good electrical connection between the conductor and the contact. It will be noted from Fig. 3 that the intermediate portion 48 is not disturbed during or by said clamping action so that said portion 48 retains the concave character thereof and extends outwardly of the companion finger 32B in substantially the same manner that the rounded portion 42 extends outwardly of its companion finger 32A. It will be noted that said rounded portions 42 and 48 are disposed within the widthwise dimension of the terminal 30 and constitute attaching or holding portions therefore to secure the terminal in position in the circuit breaker casing or housing 52. Said housing is constituted by the companion preferably molded casing parts 54 and 56, formed of a suitable insulation material, and are retained in housing defining relation, in a suitable manner, as by through bolts 58. The circuit breaker casing 52 is provided with an open ended recess 58 in which the terminal member 30 is disposed and in order to securely mount the terminal member in said recess in vertical disposition thereof, the casing members are provided with the confronting recesses 60 and 62, respectively, which are complementary to the terminal attaching portions 48 and 42, and in which the latter are received, as best illustrated in Fig. 3. The casing part 56 is provided with an opening 82 defined in wall 84 thereof through which the flexible conductor extends, the other end thereof being connected to a suitable circuit breaker mechanism disposed within the inner chamber 86 of the housing for example, as illustrated and described in Patent Re. 23,188 to Humpage, dated January 10, 1950.

When the stab terminal 30 is inserted into a slotted contact portion 216 of the bus bar 206, as illustrated in Fig. 3, the opposing fingers 32A and 32B are engaged by the opposite sides 38—38 of the contact and are urged together, so that portions 34—34 thereof abut and constitute fulcrums about which lower ends of said fingers pivot. Due to the resiliency of the fingers the latter press outwardly against the adjacent sides 38—38 of the slotted contact. As best illustrated in Fig. 5, the fingers 32A and 32B are mutually laterally offset so that they will be forced into registry upon insertion into the contact slot by the opposing sides 39—39 of the latter, as in Fig. 2. In this manner all four sides of the slotted contact are resiliently engaged by the terminal 30 to provide for a good electrical connection therewith and also to serve to firmly mechanicaly engage said fingers against the four sides of the contact slot with the ends

36—36 of said fingers extending into the underlying recess 218 defined in the insulated block 208. Therefore it will be apparent that the circuit breaker is releasably secured at one end thereof by the engagement of the holding part 220 with the casing, and at the other end thereof by the engagement of the terminal 30 in the contact slot.

Figures 6, 7, 8, 9, 10, 11, 12, 13:
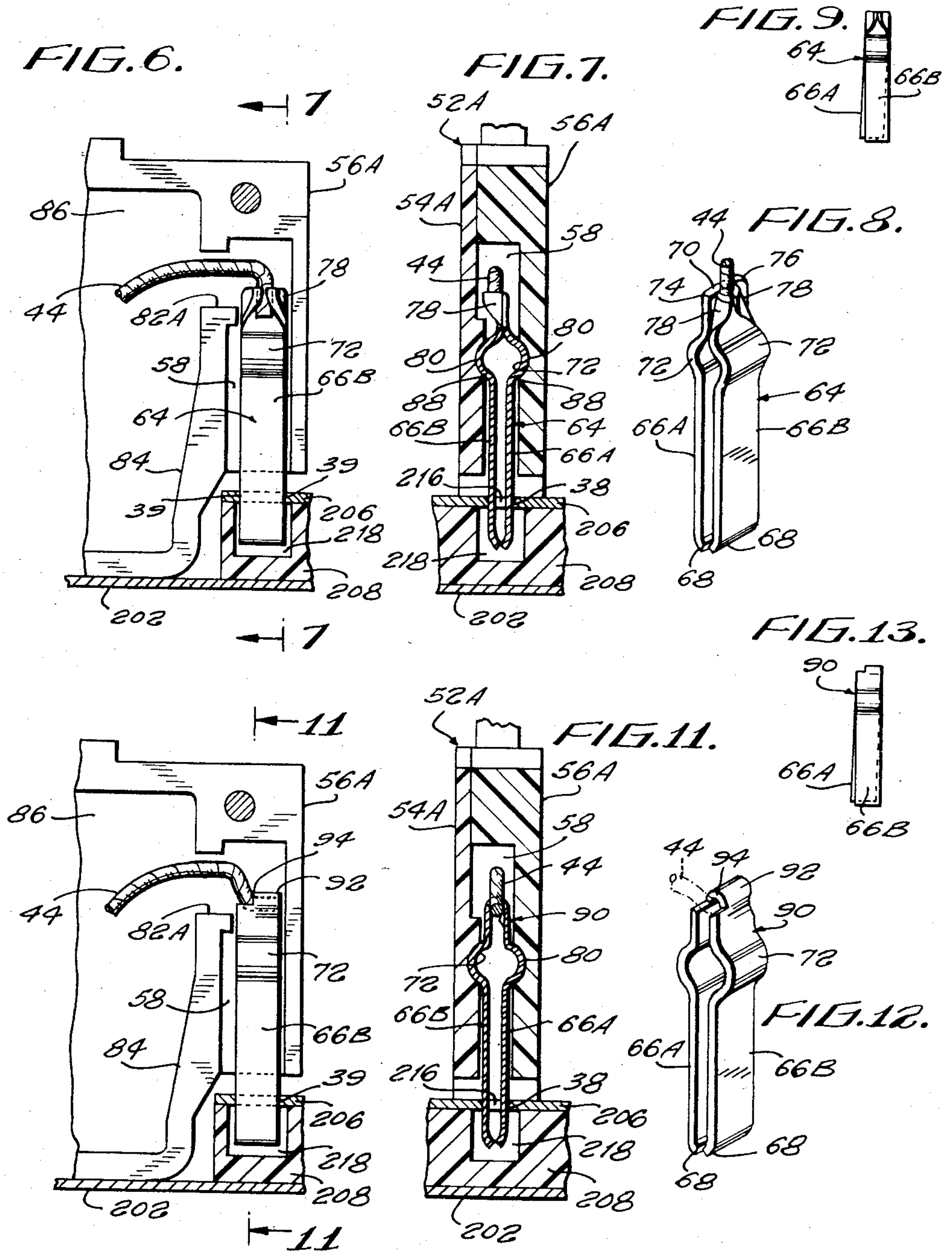
Fig. 6 is a view similar to Fig. 2, illustrating another embodiment of the invention.
Fig. 7 is a sectional view taken on the line 7—7 of Fig. 6.
Fig. 8 is a perspective view of the terminal illustrated in Figs. 6 and 7.
Fig. 9 is a view in elevation, on a reduced scale, of the terminal illustrated in Fig. 8.
Fig. 10 is a view similar to Fig. 2 illustrating a modification of the embodiment of Fig. 6.
Fig. 11 is a sectional view taken on the line 11—11 of Fig. 10.
Fig. 12 is a perspective view of the terminal illustrated in Figs. 10 and 11.
Fig. 13 is a view in elevation, on a reduced scale of the terminal illustrated in Fig. 12.

Referring now to Figs. 6–9 in detail, there is illustrated another embodiment of the present invention. Pursuant to the present embodiment, provision is made for a stab-terminal member 64 provided with the companion spring fingers 66A and 66B having the inturned free ends 68—68. The terminal member 64 is also formed from a rectangular strip of conducting material which is bent upon itself and the companion spring fingers are mutually bowed, below the bent over portion 70, as illustrated at 72—72 to provide casing attaching or holding portions which are within the widthwise dimension of the stab terminal member. In order to provide a seat for securing one end of the flexible conductor 44 to the terminal member, the bent-over portion 70 is partially cut or slit from each marginal edge thereof, transversely thereof, as indicated at 74 and 76, to form the tabs 78—78, which are rolled or bent over toward each other about the end of the conductor 44, as best illustrated in Fig. 8. The conductor 44 is firmly secured in the seat defined by the rolled portions 78—78, preferably by being swedged to the stab terminal, or in other suitable manner. In order to suitably mount the terminal member 64 in the circuit breaker casing 52A so that said member may be properly disposed within the open ended recess 58 thereof, the companion casing parts 54A and 56A are provided with the opposing recessed portions 80—80 in which the bowed finger portions 72—72 are received, as best illustrated in Fig. 7, and the casing is provided with an opening 82A defined in the wall 84A of the casing member 56A so that the conductor 44 may extend from the open ended recess 58 into the inner chamber 86 of the casing in which the circuit breaker mechanism is disposed. Each of the spring fingers 66A and 66B is provided with a fulcrum which is constituted by the bend 88 therein at the bottom of the bowed portion 80 thereof. With the fingers forced together upon insertion of the terminal member 64 into a slotted contact 206 as illustrated in Fig. 7, said fingers will press outwardly against the adjacent edges 38—38 of the contact slot. As illustrated in Fig. 9, the fingers 66A and 66B are mutually laterally offset so that they will be forced into registry upon insertion into the contact slot by the opposing sides 39—39 of the latter, as in Fig. 6. In this manner all four sides of the contact are engaged by terminal 64 to provide for a good electrical and firm mechanical connection in the same manner as described in connection with the stab terminal 30, the other casing at the opposite end being releasably secured by a holding part 220 of the pan.

Referring now to Figs. 10–13 in detail, there is illustrated a stab or prong type terminal member 90 which is a modification of the stab terminal 64. The stab terminal 90 is substantially similar in all respects to the previously described stab terminal 64 except for the provision for attachment of the flexible conductor 44 thereto. It will be noted from Fig. 12, that the bent-over end 92 is cut away transversely of the terminal member at only one marginal edge thereof, as indicated at 94. The flexible conductor 44 is inserted through the cutaway portion 94 and extends under the bent over remaining portion 92 to which it is swedged or otherwise suitably secured. It will be noted that in the stab terminal 30 illustrated in Fig. 4, the flexible conductor 44 extends laterally outwardly thereof, however, in the stab terminal members 64 and 90, the flexible conductor 44 extends upwardly from the upper bent over end of the terminal member and then through the opening 82A defined in the casing wall 84 into the inner chamber 86 of the circuit breaker for connection of the other end thereof to the circuit breaker mechanism.

Figure 14:
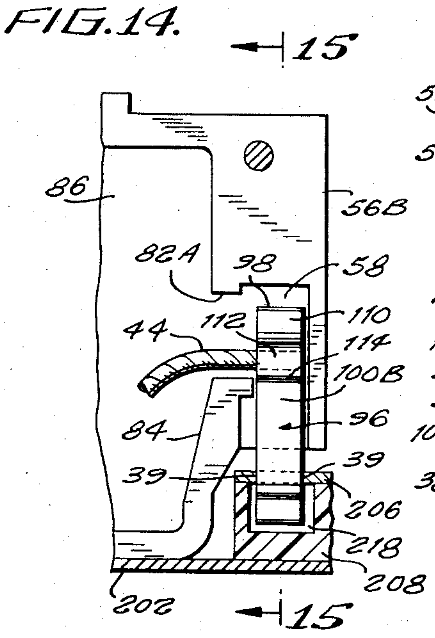
Fig. 14 is a view similar to Fig. 2 illustrating an additional embodiment of the invention.
Figure 15:
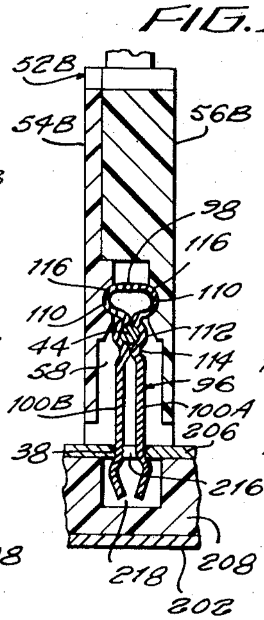
Fig. 15 is a sectional view taken on the line 15—15 of Fig. 14.
Figures 16, 17:
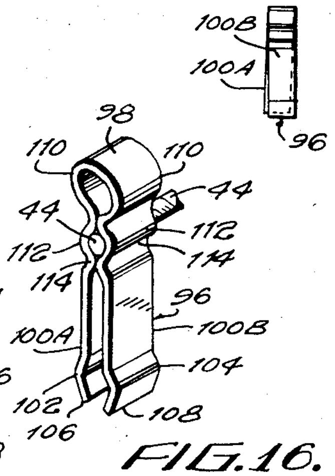
Fig. 16 is a perspective view of the terminal illustrated in Figs. 11 and 12.
Fig. 17 is a view in elevation, on a reduced scale, of the terminal illustrated in Fig. 16.
Figure 18:
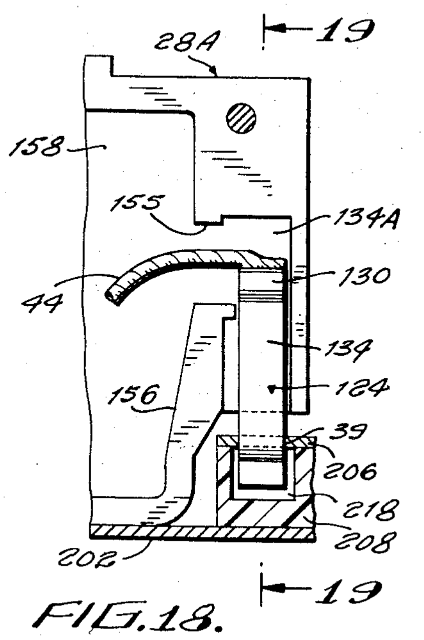
Fig. 18 is a view similar to Fig. 2, illustrating a further embodiment of the invention.

Referring now to Figs. 14–17 in detail, there is illustrated an additional embodiment of the present invention. Pursuant to the present embodiment, the flexible conductor 44 is secured in position in the stab terminal 96 below the bent over end 98 thereof. It will be understood that the terminal member 96 is also formed from a rectangular strip of suitable resilient conducting material which is bent over upon itself, as at 98, to form the companion spring fingers 100A and 100B. At their free ends, said fingers are provided with the mutually bowed portions 102 and 104, respectively, which terminate in the inwardly directed free ends 106 and 108, respectively. In the present embodiment, the opposing or concave portions 110—110 of the spring fingers 100A and 100B at the bent over upper end thereof, constitute the casing attaching or holding portions for the stab terminal member 96. Below said casing attaching portions the companion fingers are provided with the mutually bowed portions 112—112 in which the end of the flexible conductor 44 is clamped, as best illustrated in Fig. 15. The abutting bend lines 114—114 below the respective clamping portions 112—112 constitute fulcrums for the companion spring fingers 100A and 100B. With the terminal member 96 disposed in the open recess 58 of the casing 52B, the latter being provided with the confronting recessed portions 116—116 in which the casing attaching portions 110—110, respectively, are mounted, the terminal member 96 will be disposed as illustrated in Fig. 15. As will be apparent from said figure, upon insertion of the free end of the terminal member 96 into the slotted contact 206, the fingers will be forced together to allow for the entry of the bowed portions 102 and 104 into the base recess 218 and through the contact slot. It will be understood that said bowed portions 102 and 104 snap into position underneath the bus bar 206, as illustrated in Fig. 15 and serve to lock the terminal member 96 in position in the slotted contact and resiliently oppose movement of said terminal member outwardly of the slotted contact. It will be noted that the opposite sides 38—38 of the contact slot are resiliently engaged by the fingers 100A and 100B immediately above the bowed locking portions 102 and 104, respectively thereof. In addition, as will be apparent from Fig. 17, the fingers are mutually laterally offset and are forced into registry by the opposing sides 39—39 of the contact slot, as illustrated in Fig. 14, to provide for a four sided engagement of the contact slot by the terminal 96, as described in connection with the other embodiments, in addition to the interlocking action effected by the portions 102 and 104.

As previously stated, the circuit breaker 28 may be provided with any suitable circuit breaker mechanism, preferably of the type illustrated and described in Patent Re. 23,188 issued to Humpage on January 10, 1950. Further, it will be understood that any one of the previously described stab or prong terminal members will be connected through the flexible conductor which is secured thereto, to the control device of the circuit breaker mechanism, as illustrated in said Humpage patent.

As previously indicated, the circuit breaker 28 is mounted on the panelboard 200 by means of the holding part 220, which as shown in my prior patent, engages in a recess provided at the load end 120 of the circuit breaker, the stab terminal element projecting from the opposite line end of the casing to effect both electrical and mechanical connection with the slotted contact as illustrated in Figs. 2, 6, 10 and 14. As presently constructed, the distance between the center lines of adjacent slotted contacts 216 longitudinally of the bus bar 206 is substantially one half inch, and the casing of the circuit breaker 28 is also one-half inch wide, so that when the terminal stab thereof is connected to the bus bar 206 as illustrated in Fig. 1, the casing of the circuit breaker 28 will overlie the slotted contact 216 in which its stab terminal is engaged. As presently constructed, said half inch circuit breaker 28 has a current rating within a range of substantially 15 to 30 amperes.

Figures 19, 20:
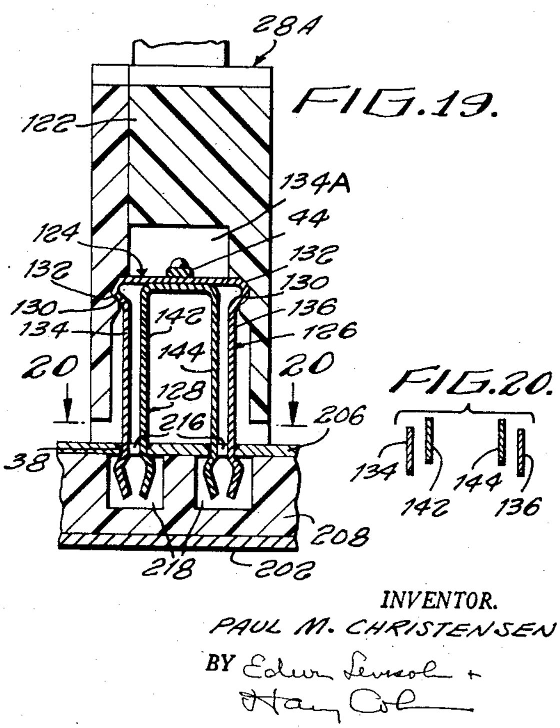
Fig. 19 is a sectional view taken on the line 19—19 of Fig. 18.
Fig. 20 is a sectional view taken on the line 20—20 of Fig. 19 with the terminals disengaged.
Figure 21:
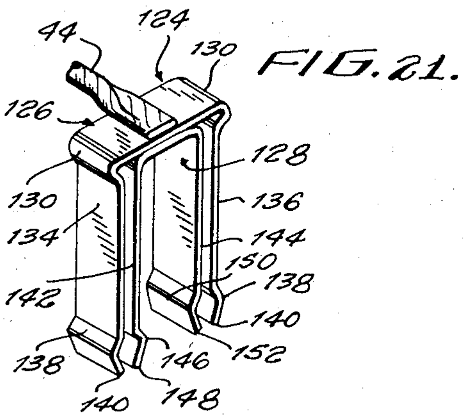
Fig. 21 is a perspective view of the terminal illustrated in Figs. 18 and 19.

Pursuant to another feature of the present invention, in order to accommodate circuit breakers of a higher current rating, for example and not by way of limitation, a circuit breaker which will have a current rating substantially within the range of 40 through 70 amperes, provision is made for the circuit breaker 28A (Fig. 1). While the circuit breaker mechanism for the circuit breaker 28A may be of the same design and construction as the mechanism for the lower rated circuit breaker 28, as is well known to those skilled in the art, the various parts thereof must be substantially larger and heavier to accommodate the higher currents. These parts would require a larger casing and, therefore, it will be noted that the casing 122 for the circuit breaker 28A is substantially twice as wide as the casing for the circuit breaker 28, the casing 122 being substantially one inch wide. To accommodate the higher current rating of the circuit breaker 28A, pursuant to an important feature of the present invention, for a plural-stab or plural-prong terminal member 124, as illustrated in Figs. 18–21. As therein shown, provision is made for a pair of rectangular inherently resilient strips of conducting material which are each formed into the shape of a U, said strips being dimensioned so that one of said strips fits within or nests within the other strip. More specifically, the plural stab 124 comprises the outer U-shaped strip 126 and the inner U-shaped strip 128. The bight or base of the strip 128 is suitably secured to the bight or base of the strip 126 so that the strip 128 lies or nests within the strip 126, as illustrated in Fig. 21, said securement being accomplished through soldering, welding or in other suitable manner. The outer strip 126 is provided at the base thereof, and within the widthwise dimension thereof, with the outwardly bowed casing attaching or holding portions 130—130 for attaching the terminal member 124 to the casing 122, the casing being provided with complementary recesses 132—132, as best illustrated in Fig. 19 for receiving said portions to mount the stab terminal in position within said casing, in the open recess 134A thereof. The strip 126 is provided with the spaced arms 134 and 136, each of which is provided with an outwardly bowed portion 138 which terminates in the inwardly directed free end 140. The inner strip 128 is provided with the spaced arms 142 and 144. Arm 142 is provided with the bowed portion 146 which confronts the bowed portion 138 of the arm 134, and is also provided with the free end 148 which is directed toward the confronting free end 140 of the arm 134. In the same manner, the arm 144 is provided with the bowed portion 150 which confronts the bowed portion 138 of the arm 136, and with the free end 152 which is directed toward the free end 140 of the arm 136. Therefore, it will be readily apparent that the plural stab 124 has two pairs of snap-type locking fingers which operate in substantially the same manner as the single pair of snap-type locking fingers previously described in connection with the stab terminal member 96 of Fig. 15. More specifically, with the circuit breaker 28A positioned on the panelboard 200, as illustrated in Fig. 1, it being understood that the line end 120A thereof is secured to the panelboard by a retaining element 220 thereon which engages in a complementary recess defined in the casing 28A, as previously described, and as illustrated in my prior patent, each pair of cooperating stab fingers thereof will be engaged in an underlying one of an adjacent pair of slotted contact terminals 216 so that the mutually bowed portions of each of said pairs of contact fingers will snap into engagement underneath the bus bar 206 to provide both a mechanical interlock, which resiliently opposes withdrawal of the stab terminal from the bus bar and which also provides for a good electrical contact between said finger pairs and the adjacent sides of the slotted contact, respectively. In this connection, it will be understood that the companion fingers of each pair are slightly mutually laterally offset, as illustrated in Fig. 20, so as to be urged into registry upon insertion into a contact slot, whereby to provide for a four-sided mutual engagement of each pair of fingers and the companion contact slot.

Figures 22, 23:
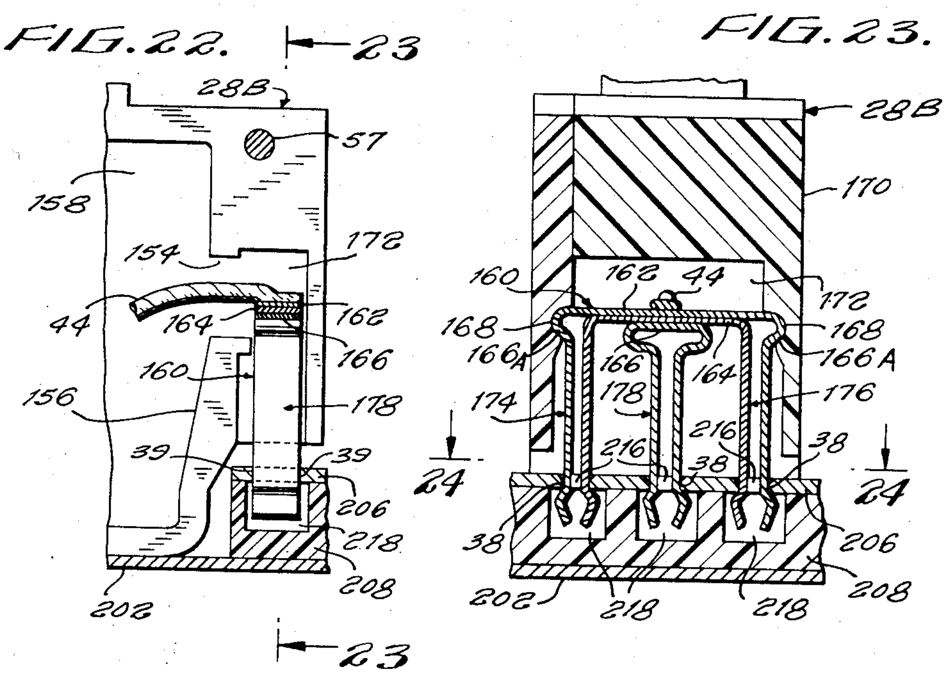
Fig. 22 is a sectional view similar to Fig. 2, illustrating a further embodiment of the invention.
Fig. 23 is a sectional view taken on the line 23—23 of Fig. 22.
Figure 25:
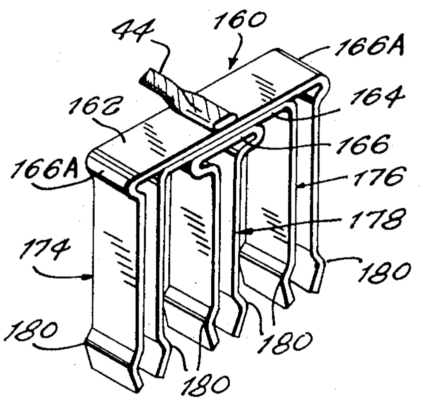
Fig. 25 is a perspective view of the terminal illustrated in Figs. 22 and 23.
Figure 24:
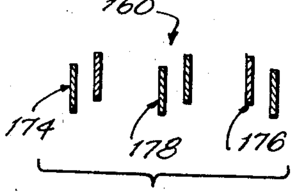
Fig. 24 is a sectional view taken on the line 24—24 of Fig. 23 with the terminals disengaged.

One end of the flexible conductor 44 is suitably secured to the plural-terminal member 124, as by being soldered or welded to the outer surface of the base portion of the strip 126, and as in connection with the previously described single types of stab terminal member, the conductor 44 extends through an opening 154 defined in the casing wall 156 for connection with the circuit breaker mechanism which is disposed within the chamber 158 defined within the casing, for connection to the control device thereof.

Where it is desired to accommodate a circuit breaker of a still higher current rating, provision may be made for an additional pair of stab fingers on the plural-type of terminal member, for example as shown by the plural stab terminal member 160 in Figs. 22–25 which is provided with three sets or pairs of stab terminal fingers. As presently constructed, the triple stab terminal 160 is utilized in a circuit breaker 28B (Fig. 1) which has a current rating substantially within the range of 80 through 100 amperes. As herein shown, the circuit breaker 28B has a widthwise dimension which is substantially three times the widthwise dimension of the circuit breaker 28 so that the widthwise dimension of the circuit breaker 28B is one and one-half inches, as presently constructed. It will be understood that the circuit breaker 28B is mounted on the panelboard 10 through the use of a retaining element 220 on the panelboard, as previously described, at the load end 120B thereof, and the line end thereof overlies three adjacent contact slots 216, which are engaged by the three pairs of fingers thereof. The triple stab 160 is formed of three rectangular inherently resilient strips of conducting material, each of which is shaped into a U, as best illustrated in Figs. 23 and 25. The outer and largest strip is indicated at 162, the intermediate strip is indicated at 164, and the inner strip is indicated at 166. It will be noted that the strip 164 nests within the strip 162, and the strip 166 nests within the strip 164, the base of the strip 166 being secured to the base of the strip 164, and the base of the latter strip being secured to the base of the strip 162. The strip 162 is provided, within the widthwise dimension thereof, with the casing attaching or holding portions 166A—166A which are formed at the base thereof, which portions are received in complementary recesses 168—168 provided in the casing 170, as best illustrated in Fig. 23. An open ended recess 172 is defined in said casing and the triple stab terminal 160 is mounted within said recess. The outer finger pairs 174 and 176 are formed by the strips 162 and 164, in the same manner as in the case of the double stab member 124, being formed by companion adjacent arms of said outer strips. The third and intermediate set or pair of stab fingers 178 is formed by the companion arms of the intermediate strip 166, as in the case of the single stab embodiment. Each pair of said fingers is provided with the mutually bowed locking portions 180, which are the same as described in connection with the double stab terminal 124 and the single stab terminal 96 so that each of the finger pairs resiliently snap engages into a contact slot and resiliently opposes removal of the circuit breaker 28B from the bus bar. In this connection, it will be understood that the companion fingers of each pair are slightly mutually laterally offset, as illustrated in Fig. 24, so as to be urged into registry upon insertion into a contact slot, whereby to provide for a four-sided mutual engagement of each pair of fingers and the companion contact slot. The flexible conductor 44 is secured to the triple stab terminal 160 in substantially the same manner as in the case of the double stab terminal 124 and extends through the opening 154 in the casing wall 156 thereof for connection with the circuit breaker mechanism, as previously described.

From the foregoing, it will be apparent that applicant has provided a circuit breaker panelboard system wherein the bus bar contacts are equally spaced longitudinally thereof, and the widthwise dimensions of the circuit breakers, which are accommodated by the panelboard, are related to the spacing between the bus bar contacts. In this manner, having only one arrangement or spacing of the bus bar contacts, the panelboard can accommodate a low current-rated circuit breaker having a widthwise dimension which is approximately equal to the spacing between an adjacent pair of contacts, longitudinally of the bus bar, and engages with one contact and the panelboard can also accommodate a higher current-rated circuit breaker which has twice the widthwise dimension of said first circuit breaker, and engages an adjacent pair of the contacts, and furthermore, the panelboard can accommodate a still higher rated circuit breaker which has a widthwise dimension three times that of the lowest rated circuit breaker and engages three adjacent contacts of the bus bar. Furthermore, pursuant to the present system, the lowest rated circuit breaker, which is accommodated by one of the contacts, is provided with a single stab terminal element, the higher rated circuit breaker which is accommodated by two of the bus bar contacts is provided with a double stab type terminal, and the highest rated circuit breaker shown here which is accommodated by three of the adjacent contacts of the bus bar, is provided with a triple stab type terminal. It will also be apparent that the same system may be used for still higher rated circuit breakers which would utilize a greater number of adjacent contacts of the bus bar and which would be provided with an equivalent number of stab finger pairs. Furthermore, it will be noted that in both the single pair as well as in the plural pair of stab terminals, the casing attaching portion of the stab terminal member is always within the widthwise dimension thereof.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. A system for interchangeably mounting, in side-by-side relation on a panelboard having a plurality of aligned equally spaced individual electrically interconnected electric terminals, electric devices of different width-wise dimensions, respectively, said system comprising the provision of an electric device having a width-wise dimension substantially equal to the spacing dimension between said panel terminals, said electric device having within the width-wise dimension thereof an individual terminal device for engagement with a single panel terminal, and another electric device having a width-wise dimension substantially equal to a multiple of said spacing dimension, said other electric device having within the widthwise dimension thereof a corresponding multiple of individual electrically interconnected terminal devices for engagement with a similar multiple of said panel terminals, whereby said first mentioned electric device may be mounted on said panelboard for engagement with one panel terminal thereof and said other electric device may be mounted in side-by-side relation therewith for engagement with a multiple number of panel terminals adjacent said one panel terminal.

2. A system for interchangeably mounting, in side-by-side relation on a panelboard having a plurality of aligned equally spaced individual electrically interconnected electric terminals, electric devices of different transverse dimensions, respectively, said system comprising the provision of an electric device having a transverse dimension substantially equal to the spacing dimension between said panel terminals, said electric device having within the transverse dimension thereof an individual terminal device for engagement with a single panel terminal, and another electric device having a transverse dimension substantially equal to a multiple of said spacing dimension, said other electric device having within the transverse dimension thereof terminal means for engagement with a similar multiple of said panel terminals, whereby said first mentioned electric device may be mounted on said panelboard for engagement with one panel terminal thereof and said other electric device may be mounted in side-by-side relation therewith for engagement with a multiple number of panel terminals adjacent said one panel terminal, said first mentioned electric device being provided with single-element terminal means and said other electric device being provided with plural element terminal means equal in number to said multiple.

3. A system for interchangeably mounting, in side-by-side relation on a panelboard having a plurality of aligned equally spaced discrete electrically interconnected electric terminals, electric devices of different width-wise dimensions, respectively, said system comprising the provision of an electric device having a width-wise dimension substantially equal to the spacing dimension between said panel terminals, said electric device having within the width-wise dimension thereof an individual terminal element frictionally engageable with a single panel terminal, and another electric device having a width-wise dimension substantially equal to a multiple of said spacing dimension, said other electric device having within the width-wise dimension thereof terminal means for engagement with a similar multiple of said panel terminals, whereby said first mentioned electric device may be mounted on said panelboard for engagement with one panel terminal thereof and said other electric device may be mounted in side-by-side relation therewith for engagement with a multiple number of panel terminals adjacent said one panel terminal, the terminal means of said other electric device being provided with plural individual electrically interconnected elements equal in number to said multiple and frictionally engageable with said discrete panelboard terminals, respectively.

4. In combination, an automatic circuit breaker and a terminal panel, said circuit breaker comprising a circuit breaker mechanism, a casing enclosing said mechanism and provided with an engageable part, and individual spaced terminal means mounted by said casing and having a plurality of terminal portions which are electrically interconnected and electrically connected to said mechanism, said panel having a part adapted to releasably engage said engageable part of the circuit breaker casing for holding said circuit breaker, and a plurality of spaced individual electrically interconnected electric terminals provided on said panel complementary to said terminal portions, respectively, for effecting electric contact with said terminal portions, respectively, said terminal portions and electric terminals being adapted to releasably interlock, whereby said parts, said terminal portions and said electric terminals together cooperate to releasably mechanically lock said circuit breaker in position on said panel.

5. In combination, an automatic circuit breaker and a terminal panel, said circuit breaker comprising a circuit breaker mechanism, a casing enclosing said circuit breaker mechanism and provided with an engageable part, and individual spaced terminal means mounted by said casing and having a plurality of terminal portions which are electrically interconnected and electrically connected to said mechanism, said panel having a part adapted to releasably engage said engageable part of the circuit breaker casing for holding said circuit breaker, and a plurality of equally spaced individual electrically interconnected electric terminals provided on said panel complementary to said terminal portions, respectively, for effecting electric contact with said terminal portions, respectively, said terminal portions and electric terminals being adapted to releasably interlock, whereby said parts, said terminal portions and said electric terminals together cooperate to releasably mechanically lock said circuit breaker in position on said panel, said casing part and said terminal portions being at opposite ends, respectively, of said casing.

6. In combination, an automatic circuit breaker and a terminal panel, said circuit breaker comprising a circuit breaker mechanism, a casing enclosing said circuit breaker mechanism and provided with an engageable part, and terminal means mounted by said casing and having a plurality of terminal portions, said panel having a part adapted to releasably engage said engageable part of the circuit breaker casing for holding said circuit breaker, and a plurality of individual electrically interconnected electric terminals provided on said panel complementary to said terminal portions, respectively, for effecting electric contact with said terminal portions, respectively, said terminal portions and electric terminals being adapted to releasably interlock, whereby said parts, said terminal portions and said electric terminals together cooperate to releasably mechanically lock said circuit breaker in position on said panel, said terminal portions each being a pair of resilient fingers having provision to snap into releasable locking engagement with a complementary panel terminal, and said pairs being electrically connected to each other and to said mechanism.

7. In combination, an automatic circuit breaker and a terminal panel, said circuit breaker comprising a circuit breaker mechanism, a casing enclosing said mechanism and provided with an engageable part, and terminal means mounted by said casing and having a plurality of terminal portions, said panel having a part adapted to releasably engage said engageable part of the circuit breaker casing for holding said circuit breaker, and a plurality of individual electrically interconnected electric terminals provided on said panel complementary to said terminal portions, respectively, for effecting electric contact with said terminal portions, respectively, said terminal portions and electric terminals being adapted to releasably interlock, whereby said parts, said terminal portions and said electric terminals together cooperate to releasably mechanically lock said circuit breaker in position on said panel, said terminal means comprising a pair of substantially U-shaped members secured together in nested relation, the adjacent arms of said members being paired to constitute a terminal portion, and said members being electrically connected to each other and to said mechanism.

8. In combination, an automatic circuit breaker and a terminal panel, said circuit breaker comprising a circuit breaker mechanism, a casing enclosing said mechanism and provided with an engageable part, and terminal means mounted by said casing and having a plurality of terminal portions, said panel having a part adapted to releasably engage said engageable part of the circuit breaker casing for holding said circuit breaker, and a plurality of individual electrically interconnected electric terminals provided on said panel complementary to said terminal portions, respectively, for effecting electric contact with said terminal portions, respectively, said terminal portions and electric terminals being adapted to releasably interlock, whereby said parts, said terminal portions and said electric terminals together cooperate to releasably mechanically lock said circuit breaker in position on said panel, said terminal means comprising three substantially U-shaped members secured together in nested relation the adjacent arms of the two outer members being paired to constitue a terminal portion, and the arms of the third member together constituting a terminal portion, and said members being electrically connected to each other and to said mechanism.

9. In combination, an automatic circuit breaker and a terminal panel, said circuit breaker comprising a circuit breaker mechanism, a casing enclosing said mechanism and provided with an engageable part, and a terminal member mounted by said casing and having a plurality of laterally spaced discrete terminal portions which are electrically interconnected and electrically connected to said mechanism, said panel having a part adapted to releasably engage said engageable part of the circuit breaker casing for holding said circuit breaker, and a plurality of laterally spaced individual electrically interconnected electric terminals provided on said panel complementary to said terminal portions, respectively, for effecting electric contact with said terminal portions, respectively, said terminal portions and electric terminals being adapted to releasably interlock, whereby said parts, said terminal portions and said electric terminals together cooperate to releasably mechanically lock said circuit breaker in position on said panel.

10. In combination, an automatic circuit breaker and a terminal panel, said circuit breaker comprising a circuit breaker mechanism, a casing enclosing said mechanism and provided with an engageable part, and a terminal member mounted by said casing and having a plurality of laterally spaced discrete terminal portions which are electrically interconnected and electrically connected to said mechanism, said panel having a part adapted to releasably engage said engageable part of the circuit breaker casing for holding said circuit breaker, and a plurality of laterally spaced individual electrically interconnected electric terminals provided on said panel complementary to said terminal portions, respectively, for effecting electric contact with said terminal portions, respectively, said terminal portions and electric terminals being adapted to releasably interlock, whereby said parts, said terminal portions and said electric terminals together cooperate to releasably mechanically lock said circuit breaker in position on said panel, said panel terminals being constituted by slotted portions thereof, and said terminal portions each being a pair of resilient fingers having provision to snap into releasable locking engagement with a complementary panel slot.

11. In combination, a plurality of automatic circuit breakers of different current-ratings, respectively, and a panelboard for mounting said breakers, said panelboard having a plurality of aligned laterally spaced individual electrically interconnected electric terminals, each of said breakers having a circuit breaker mechanism provided with electric terminal means complementary to said panel terminals, one of said breaker terminal means being single-stab terminal means for engagement with a single panel terminal, and another of said breaker terminal means being a plural-stab terminal means for engagement with a plurality of panel terminals, all of said plural-stab terminal means being electrically interconnected and electrically connected to the mechanism of the associated circuit breaker.

12. An automatic circuit breaker comprising a casing, a circuit breaker mechanism provided within said casing, and a plurality of terminals adapted for electrical engagement with complementary discrete mutually spaced-apart panel board bus terminals, said plurality of terminals being mounted by said casing, and said plurality of terminals being permanently electrically interconnected and electrically connected to said mechanism and being spaced apart in conformity with the panel board bus terminals.

13. An automatic circuit breaker comprising a casing, a circuit breaker mechanism provided within said casing, and a plurality of terminals adapted for electrical engagement with complementary discrete mutually spaced-apart panel board bus terminals, said plurality of terminals being mounted by said casing, and said plurality of terminals being permanently electrically interconnected and electrically connected to said mechanism and being spaced apart in conformity with the panel board bus terminals, said plurality of terminals being in laterally spaced disposition.

14. An automatic circuit breaker comprising a casing, a circuit breaker mechanism provided within said casing, and a plurality of terminals adapted for electrical engagement with complementary discrete mutually spaced-apart panel board bus terminals, said plurality of terminals being mounted by said casing, and said plurality of terminals being permanently electrically interconnected and electrically connected to said mechanism and being spaced apart in conformity with the panel board bus terminals, said plurality of terminals projecting from said casing in laterally spaced disposition widthwise of said casing.

15. A circuit breaker adapted to be mounted on a panel board having a plurality of spaced individual electric terminals for connection of said circuit breaker to an electric current supply, said circuit breaker having a pair of relatively movable contacts engageable with and disengageable from each other to make and break a circuit, current responsive means, mechanism operable under the control of said current responsive means to effect the disengagement of said contacts, and a plurality of individual plug-in terminal members permanently electrically connected to each other and to one of said contacts, said plug-in terminal members being mounted in the circuit breaker for conjoint movement to and from plug-in and plug-out positions to electrically engage and disengage the individual terminals, respectively, of the panel board.

16. A circuit breaker panel board assembly comprising a panel board and a circuit breaker mounted thereon, said panel board and said circuit breaker having a plurality of individual terminals spaced from each other on the panel board and on the circuit breaker, respectively, said circuit breaker having a pair of relatively movable contacts engageable with and disengageable from each other to make and break a circuit, current responsive means, mechanism operable under the control of said current responsive means to effect the disengagement of said contacts, said circuit breaker having a set of individual terminals releasably engageable with said individual terminals of the panel board in companion pairs, one terminal of each pair having resiliently movable parts in engagement with the other terminal of the pair, the terminals of said set being permanently electrically connected to each other and mounted in the circuit breaker for conjoint movement into and out of engagement with the companion terminals of said panel board.

17. A circuit breaker panel board assembly comprising a panel board having a bus bar in which there is provided a plurality of spaced recesses constituting electric terminals, and a circuit breaker mounted on said panel board and electrically connected to the terminals thereof for connection of said circuit breaker to an electric current supply, said circuit breaker having a pair of relatively movable contacts engageable with and disengageable from each other to make and break a circuit, current responsive means, mechanism operable under the control of said current responsive means to effect the disengagement of said contacts, and a plurality of plug-in terminal members permanently electrically connected to each other and in circuit with one of said contacts, each of said individual plug-in terminal members having relatively movable portions releasably engageable with said bus bar in a recess of said bus bar, said plug-in terminal members being mounted in the circuit breaker for conjoint movement to and from plug-in and plug-out position to electrically engage and disengage said bus bar recesses, respectively.

18. A circuit breaker adapted to be mounted on a panel board having a plurality of spaced electric terminals for connection of said circuit breaker to an electric current supply, said circuit breaker having a casing in which there is provided a pair of relatively movable contacts engageable with and disengageable from each other to make and break a circuit, current responsive means, mechanism operable under the control of said current responsive means to effect the disengagement of said contacts, and a plurality of indiivdual plug-in terminal members carried by said casing and permanently electrically connected to each other and to one of said contacts, each of said plug-in terminal members being of the type having resiliently movable companion parts and said individual plug-in terminal members being mounted for conjoint movement to and from plug-in and plug-out position to electrically engage and disengage the spaced terminals, respectively, of said panel board.

19. A circuit breaker panel board assembly comprising a panel board having areas for receiving a plurality of single-pole circuit breakers, each of said panel board areas including an individual electric terminal for mating engagement with a companion individual plug-in terminal member of a single-pole circuit breaker, at least certain of said electric terminals of adjoining areas being electrically connected to and spaced from each other, and a circuit breaker on said panel board having a pair of relatively movable contacts engageable with and disengageable from each other to make and break a circuit, current responsive means, mechanism under control of said current responsive means to effect the disengagement of said contacts, and a plurality of individual plug-in terminal members permanently electrically connected to each other and to one of said contacts, said plug-in terminal members being carried by the circuit breaker in mutually spaced relation for conjoint movement into electrical engagement individually with the respective terminals of a plurality of said adjoining circuit breaker receiving areas of the panel board.

20. A circuit breaker panel board assembly comprising a panel board having areas for receiving a plurality of single-pole circuit breakers, each of said panel board areas including an individual electric terminal for mating engagement with a companion individual plug-in terminal member of a single-pole circuit breaker and including an individual circuit breaker retaining element, at least certain of said electric terminals of adjoining areas being electrically connected to and spaced from each other, and a circuit breaker on said panel board having a part releasably engaged with a companion retaining element of the panel board, a pair of relatively movable contacts engageable with and disengageable from each other to make and break a circuit, current responsive means, mechanism under control of said current responsive means to effect the disengagement of said contacts, and a plurality of individual plug-in terminal members of the type having resiliently movable parts, said individual terminal members being permanently electrically connected to each other and to one of said contacts, said plug-in terminal members being carried by the circuit breaker in mutually spaced relation for conjoint movement into electrical engagement individually with the respective terminals of a plurality of said adjoining circuit breaker receiving areas of the panel board.

21. A circuit breaker panel board assembly comprising a panel board having uniform adjoining areas for receiving a plurality of circuit breaker units, each of said panel board areas being provided with an individual electric terminal spaced from but electrically connected to the electric terminal of an adjoining area, a plurality of circuit breaker units mounted on said panel board, each of said units including a pair of relatively movable contacts engageable with and disengageable from each other, current responsive means, mechanism operable under the control of said current responsive means to effect the disengagement of said contacts, at least one of said circuit breaker units having an individual plug-in terminal member releasably engageable with the individual terminal member of one of said areas of the panel board, and at least one of said circuit breaker units having a plurality of individual plug-in terminal members electrically connected to one of said contacts thereof and electrically connected to each other and permanently mounted in mutually spaced relation for conjoint movement into releasable engagement individually with a plurality of spaced and electrically connected individual terminals of adjoining areas of said panel board.

22. A circuit breaker panel board assembly comprising a panel board having areas for receiving a plurality of single-pole circuit breakers, each of said panel board areas including an individual electric terminal for mating engagement with a companion individual plug-in terminal of a single-pole circuit breaker, at least certain of said individual electric terminals of adjoining areas being electrically connected to and spaced from each other, and each of said panel board areas including mechanical means for locating a single-pole circuit breaker in such area, each such mechanical means being spaced from said individual electric terminal of that area of the panel board, and a circuit breaker on said panel board having a pair of relatively movable contacts engageable with and disengageable from each other to make and break a circuit, current responsive means, mechanism under control of said current responsive means to effect the disengagement of said contacts, and a plurality of individual plug-in terminals permanently electrically connected to each other and to one of said contacts, said plug-in terminals being carried by the circuit breaker in mutually spaced relation for conjoint movement in electrical management individually with the respective individual electric terminals of a plurality of said adjoining circuit breaker receiving areas of the panel board, each said individual electric terminal of the panel board and the companion individual plug-in terminal of a circuit breaker in mating engagement therewith constitute a mating pair of terminals, one terminal of each of said mating pair of terminals including resiliently movable parts in engagement with the other terminal of said mating pair of terminals.

References Cited in the file of this patent

UNITED STATES PATENTS

| | | |
|---|---|---|
| 1,938,309 | Williams | Dec. 5, 1933 |
| 1,955,287 | Graves | Apr. 17, 1934 |
| 2,038,107 | Harvey | Apr. 21, 1936 |
| 2,189,993 | Ramsey | Feb. 13, 1940 |
| 2,282,520 | Jackson | May 12, 1942 |
| 2,332,319 | Kempton | Oct. 19, 1943 |
| 2,336,385 | Batcheller | Dec. 7, 1943 |
| 2,359,247 | Rowe | Sept. 26, 1944 |
| 2,456,764 | Bach | Dec. 21, 1948 |
| 2,632,039 | Hammerly | Mar. 17, 1953 |
| 2,647,225 | Cole | July 28, 1953 |
| 2,719,251 | Stewart | Sept. 27, 1955 |